(12) United States Patent
Carpaij et al.

(10) Patent No.: US 9,229,024 B2
(45) Date of Patent: Jan. 5, 2016

(54) METHOD FOR ADJUSTING A SELF MIXING LASER SENSOR SYSTEM FOR MEASURING THE VELOCITY OF A VEHICLE

(75) Inventors: Mark Carpaij, Aachen (DE); Alexander Marc Van Der Lee, Venlo (NL); Bernd Engelbrecht, Landgraaf (NL); Marcel Schemmann, Maria Hoop (NL); Carsten Heinks, Neuenhaus (DE); Holger Moench, Vaals (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1203 days.

(21) Appl. No.: 13/145,261

(22) PCT Filed: Jan. 18, 2010

(86) PCT No.: PCT/IB2010/050214

§ 371 (c)(1),
(2), (4) Date: Sep. 30, 2011

(87) PCT Pub. No.: WO2010/084448

PCT Pub. Date: Jul. 29, 2010

(65) Prior Publication Data

US 2012/0016615 A1    Jan. 19, 2012

(30) Foreign Application Priority Data

Jan. 20, 2009    (EP) ..................................... 09150935

(51) Int. Cl.
*G01P 3/36*    (2006.01)
*G01S 1/00*    (2006.01)
(Continued)

(52) U.S. Cl.
CPC ................. *G01P 3/366* (2013.01); *G01P 21/02* (2013.01); *G01S 1/00* (2013.01); *G01S 7/4916* (2013.01);
(Continued)

(58) Field of Classification Search
CPC ............................... G01S 17/58; G01S 7/4916
USPC ..................................................... 702/85–107
See application file for complete search history.

(56) References Cited

U.S. PATENT DOCUMENTS 5,299,131 A    3/1994 Haas et al.
5,898,390 A    4/1999 Oshizawa et al.
(Continued)

FOREIGN PATENT DOCUMENTS

JP    2005049355    2/2005
JP    2008032632    2/2008
(Continued)

OTHER PUBLICATIONS

Davilla, Buundio; Huntley, Jonathan; Kaufmann, Guillermo; Kerr, David; "High-speed dynamic speckle interferometry: phase errors due to intensity, velocity, and speckle decorrelation"; Jul. 1, 2005; Applied Optics; vol. 44, No. 19; pp. 3954-3962.*
(Continued)

*Primary Examiner* — Christine Liao

(57) ABSTRACT

The method is based on a determination of the orientation of the sensor to the surface moving with respect to the sensor and then acquiring data where the lateral velocity is small and the forward velocity is large. Then, the orientation of the sensor with respect to the direction of the forward velocity is determined and the velocity data subsequently measured are corrected using the measured orientation of the sensor with respect to the reference surface and the forward velocity direction.

18 Claims, 10 Drawing Sheets

(51) Int. Cl.
  *G01S 7/491* (2006.01)
  *G01S 13/60* (2006.01)
  *G01P 21/02* (2006.01)
  *G01S 7/497* (2006.01)
  *G01S 17/58* (2006.01)
  *G01S 17/87* (2006.01)
  *G01P 13/00* (2006.01)
  *G01C 22/00* (2006.01)

(52) U.S. Cl.
  CPC .............. *G01S 7/4972* (2013.01); *G01S 13/60* (2013.01); *G01S 17/58* (2013.01); *G01S 17/875* (2013.01); *B60T 2250/04* (2013.01); *G01C 22/00* (2013.01); *G01P 13/00* (2013.01)

(56) References Cited

U.S. PATENT DOCUMENTS

| | | | |
|---|---|---|---|
| 6,141,086 A | 10/2000 | Vahala et al. | |
| 6,233,045 B1* | 5/2001 | Suni et al. | 356/28.5 |
| 6,532,419 B1 | 3/2003 | Begin et al. | |
| 6,792,803 B2 | 9/2004 | Bauer et al. | |
| 6,885,438 B2* | 4/2005 | Deines | 356/28.5 |
| 7,075,459 B1 | 7/2006 | Begin et al. | |
| 7,079,228 B2 | 7/2006 | Jamieson et al. | |
| 7,202,942 B2 | 4/2007 | Deines | |
| 7,505,033 B2* | 3/2009 | Guo et al. | 345/166 |
| 2001/0016799 A1* | 8/2001 | Kitazumi et al. | 702/75 |
| 2003/0182041 A1 | 9/2003 | Watson | |
| 2004/0109155 A1 | 6/2004 | Deines | |
| 2004/0204798 A1* | 10/2004 | Imada et al. | 701/1 |
| 2006/0265112 A1 | 11/2006 | Hoeffel et al. | |
| 2007/0058157 A1 | 3/2007 | Deines | |
| 2008/0086248 A1* | 4/2008 | Lu et al. | 701/41 |
| 2008/0114545 A1* | 5/2008 | Takaoka et al. | 701/220 |
| 2009/0150075 A1* | 6/2009 | Watanabe et al. | 701/214 |

FOREIGN PATENT DOCUMENTS

| | | |
|---|---|---|
| WO | 9015337 A1 | 12/1990 |
| WO | 2008031639 A1 | 3/2008 |
| WO | 2009037278 A1 | 3/2009 |

OTHER PUBLICATIONS

"High-Precision Real Time Measurement of Car Speed Using Laser Surface Velocimetry", www.polytec.com, 2006, pp. 1-2, Special Issue 2.

Bosch et al., "A Double-Laser Diode Onboard Sensor for Velocity Measurements", Feb. 2004, pp. 95-101, vol. 53, No. 1, Piscataway, NJ.

* cited by examiner

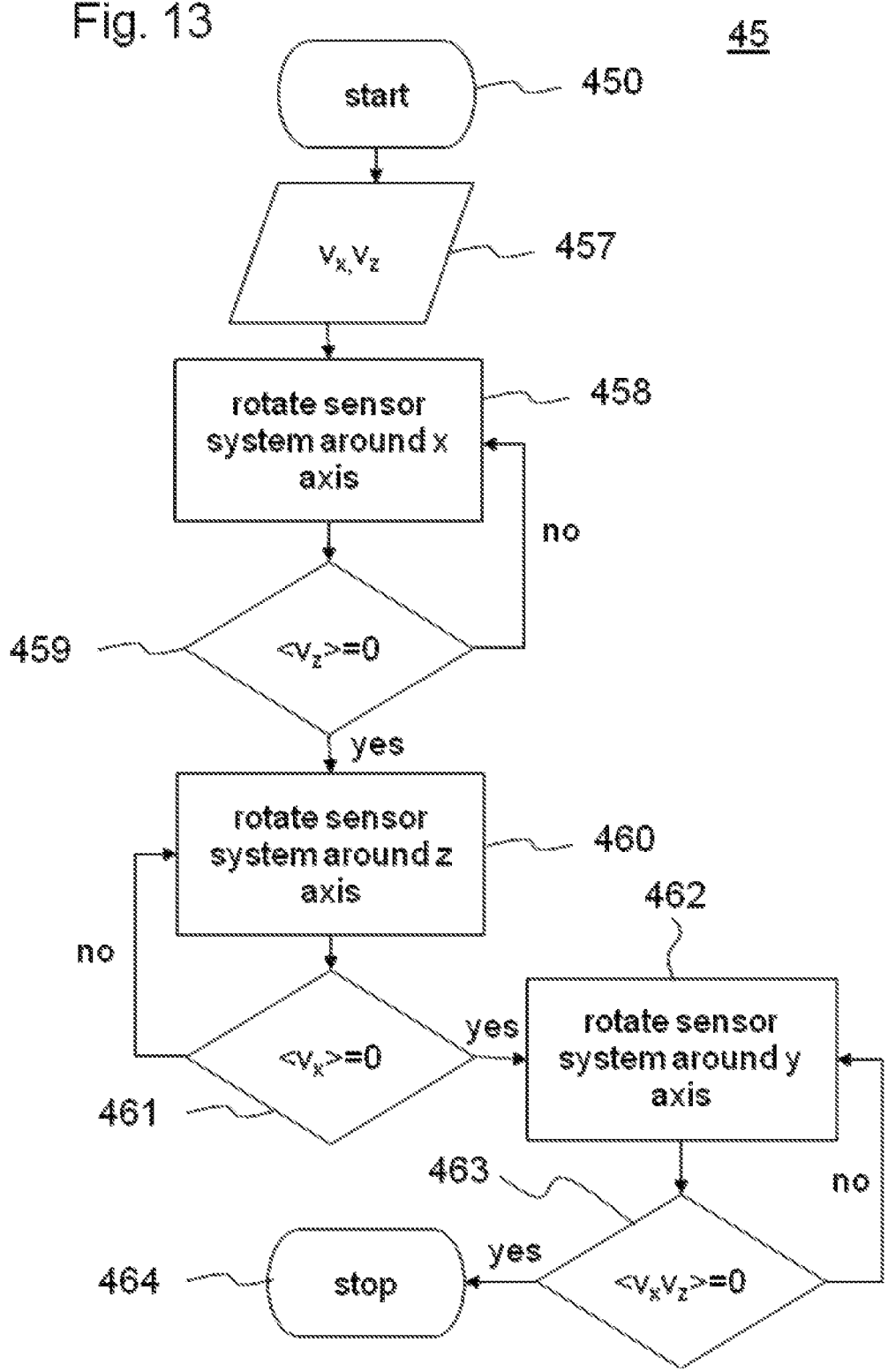

METHOD FOR ADJUSTING A SELF MIXING LASER SENSOR SYSTEM FOR MEASURING THE VELOCITY OF A VEHICLE

FIELD OF THE INVENTION

The present invention is related to a method for adjusting a self mixing laser sensor system for measuring the velocity of a vehicle, a corresponding laser self-mixing sensor, a computer program for adjusting a self mixing laser sensor system for measuring the velocity of a vehicle, a data storage medium comprising the computer program, a self mixing laser sensor system being coupled to the data storage medium and a vehicle comprising the self mixing laser sensor system and the data storage medium.

BACKGROUND OF THE INVENTION

Conventional measurement devices for vehicle speed need an additional independent reference speed in order to calibrate the measurement device. In US2006/0265112 A1, for example, a method and system for calibrating speed of a vehicle having plurality of wheels is disclosed. The method comprises the steps of sensing a first vehicle speed based on an average tire size associated with the plurality of wheels; sensing a second vehicle speed based on global positioning data; and automatically calibrating the speed of the first and second vehicle speed. The method of calibration is inaccurate as the first vehicle speed as well as the second vehicle speed are determined indirectly and are not independent.

Automotive speed over ground sensing based on self-mixing laser Doppler interferometry is expected to be of increasing importance, inter alia to improve ESP and other car safety systems.

However, to measure the speed-over-ground of a car, the orientation of the sensor with respect to the road surface influences the measurement. As well, velocity components laterally to the driving direction and vibrations influence the calculation of the velocity from the measured interferometric signals.

For car safety systems, the dynamics of the car is continuously being monitored. Currently, safety systems make use of the input of wheel sensors measuring the revolution of each single wheel, and several input signals from a central sensor box with e.g. a multi-axes accelerometer and a gyroscope. The kinetic data recorded is unfortunately incomplete. Currently, it is only possible to measure acceleration and rotation of the car bodywork together with the forward velocity of the car derived from the revolutions of the wheels. There are, however, no commercial sensor systems available which measure the velocity picked up by the car with respect to the road.

Such a measurement of the speed-over-ground of a car would (1) result in a direct instead of derived measurement of the forward velocity, and (2) give access to the lateral velocity of car. Especially the lateral velocity picked up by the car is a very useful control parameter for car safety systems making possible a considerable improvement of current safety systems.

In principle, several technologies could be employed to measure the speed-over-ground. For example, one could consider RADAR, camera-based image recognition techniques, or laser Doppler interferometry. However, these technologies need to be able to deal with the strongly varying conditions typically encountered in automotive (e.g. in heavy weather such as rain, or snow), have a manageable size, and be cost-effective. For the first time, a technology has been identified, namely laser sensors using the self-mixing interference principle, which boils down to laser Doppler interferometry, which fulfills all these automotive-specific requirements.

A SMI sensor incorporates a laser which is aimed at the road under a certain angle. When the laser beam hits the road, it will be reflected in all directions. When the road moves with respect to the laser (i.e. the car with the laser mounted thereon moving with respect to the road), the frequency of the reflected light is slightly different from the frequency of the incident laser beam. This frequency shift is the so-called Doppler shift and proportional to the component of the velocity of the road into the direction of the laser beam. When a small portion of this reflected, Doppler-shifted laser light re-enters the laser cavity, it will mix with the 'undisturbed' laser cavity light leading to an interference pattern. This interference pattern will change periodically with again exactly the Doppler frequency. These changing interference patterns inside the laser cavity lead to laser power fluctuations; in this way the Doppler frequency and thus the road velocity can be determined from the laser power.

In order to measure the two-dimensional velocity vector of the car with respect to the road, two laser beams are required. Also, the exact angles between the laser beams and the road, and the laser beams and the car need to be known in order to relate the Doppler frequency shift to the car's velocity.

The problem of applying Doppler interference to measure the speed-over-ground of a car lies within the fact that for the velocity measurement the exact orientation of the sensor with respect to the road and the sensor with respect to the heading direction must be known. However, since the laser sensor is mounted to the car bodywork, its orientation, and thus the angles of the incident laser beams, will change continuously due to suspension vibrations. Simulations have shown that a small deviation of the equilibrium suspension situation of 5 centimeters leads to an unacceptable measurement error. However, action of the suspension system is unpredictable and thus it leads to unacceptably low measurement accuracy. The same also holds for a misalignment of the sensor with respect to the forward or heading direction.

SUMMARY OF THE INVENTION

It is therefore an object of the invention to provide an optical velocity sensor with increased accuracy. This object is solved by the subject matter of the independent claims. Advantageous embodiments and refinements of the invention are specified in the dependent claims.

The inventive solution as defined in the claims is based on a determination of the orientation of the sensor to the surface moving with respect to the sensor and then acquiring data where the lateral velocity is small and the forward velocity is large. Then, the orientation of the sensor with respect to the direction of the forward velocity is determined and the velocity data subsequently measured are corrected using the measured orientation of the sensor with respect to the reference surface and the forward velocity direction.

The object is achieved by means of a method of adjusting a self mixing laser sensor for measuring the velocity of a vehicle moving relative to a reference surface. The method comprises the steps of:

determining the frequency of self-mixing intensity oscillations caused by Doppler-induced phase shift of the laser light reflected back from the surface and re-entering the cavity of the at least one laser, calculating a velocity from said frequency of self-mixing intensity oscillations, determining the orientation of the sensor in relation to the reference surface and a predetermined direction of movement using at least a first laser beam of the self mixing laser sensor, the step of determining the orientation of the sensor comprising the steps of determining, whether the direction of movement of the vehicle coincides with a predetermined direction of movement, obtaining velocity data for a movement of the vehicle along the predetermined direction of movement, and calculating a transformation based on said velocity data for a movement of said vehicle along the predetermined direction of movement.

The method further comprises the step of adjusting velocity data determined by means of the self mixing laser sensor based on the determined orientation of the sensor by applying the transformation to measured velocity data.

The corresponding laser self-mixing velocity sensor for determining the velocity moving relative to a reference surface comprises circuitry for determining the frequency of self-mixing intensity oscillations caused by Doppler-induced phase shift of the laser light reflected back from the surface and re-entering the cavity of the at least one laser, circuitry for determining the velocity along at least one predetermined direction from the self-mixing intensity oscillations, and circuitry for determining the orientation of the sensor in relation to the reference surface using at least a first laser beam of the self mixing laser sensor. This circuitry comprises circuitry for determining, whether the direction of movement of the vehicle coincides with a predetermined direction of movement, obtaining velocity data for a movement of said vehicle along said predetermined direction of movement, and calculating a transformation based on the velocity data for a movement of the vehicle along the predetermined direction of movement.

Further, circuitry is provided for adjusting velocity data determined by means of the self mixing laser sensor based on the determined orientation of the sensor by applying the transformation to measured velocity data.

The coincidence of the measured direction of movement with the predetermined direction may not be exact. Rather, a coincidence is in general already assumed if a threshold condition is met. For example, if the measured lateral velocity falls below a threshold, it can be assumed that the measured velocity is mainly a velocity along the forward direction without a substantial contribution of lateral velocity components. These and other criteria are set forth below in more detail.

Further, the invention may be implemented as a computer program for adjusting a self mixing laser sensor system for measuring the velocity of a vehicle moving relative to a reference surface, or a data storage medium comprising the computer program. The computer program comprises program code means for the self mixing laser sensor system for measuring the velocity of a vehicle moving relative to carry out the steps of the method as described above, when the computer program runs on a computer controlling the self mixing laser sensor system. The self mixing laser sensor system as described above then may be coupled to the data storage medium so as to perform the method according to the invention.

The predetermined direction of movement may in particular be the forward direction. Thus, in case of a car or motorcycle, the forward direction is the actual direction of movement if the vehicle is driving straight ahead.

A misalignment of the sensor system with respect to the moving surface can arise both from a misalignment with respect to the reference surface and the velocity vector. The method according to the invention serves to compensate both misalignments. If the transformation is applied to the velocity data, the components of lateral and forward movement can be extracted unambiguously.

According to a preferred embodiment of the invention, the velocity is determined by at least three laser beams, each laser beam having a different azimuthal angle with respect to the perpendicular of the reference surface. It has been shown that an arrangement of three laser beams permits a correct determination of the movement vector nearly independent from a misalignment of the sensor system. However, the invention allows to clearly distinguish between true lateral and forward velocity components.

As the exact orientation of the laser beams with respect to the reference surface and the forward velocity direction is known after applying the transformation obtained by the calibration method according to the invention, the inventive method also permits a measurement with enhanced accuracy since the forward velocity can be determined independently from more than one laser beam.

It is therefore preferably proposed to use a multiple-axes laser sensor. Such a system according to the invention comprises at least three lasers with known and constant, i.e. for example monolithically fixed angles between them. These known, well-fixed, angles between them have the surprising advantage that exactly the forward and lateral velocity components can be calculated from the three Doppler frequencies without vibrations disturbing the measurement result.

The Doppler frequency $f_i$ measured by sensor i can be written as $$f_i = \sum_{k=1}^{N} M_{ik} v_k \qquad \text{(Eq. 1)}$$

Here, $M_{ik}$ describes the angular configuration of sensor i and velocity component $v_k$. N is the dimension of the velocity vector.

Suppose O laser sensors are applied to measure the N-dimensional velocity vector, then an estimate of the velocity vector, $\hat{v}$, from all Doppler frequencies is given by $$\hat{v}_k = \sum_{i=1}^{O} M_{ki}^{-1} f_i \qquad \text{(Eq. 2)}$$

Here $M^{-1}$ is the inverse of matrix M of Eq. 1. The equation above only has a unique solution when O is at least equal to or greater than N, that is when at least N sensors are used to determine an N-dimensional velocity vector. If O>N, the estimation of the $v_k$'s can be fitted (least-squared error), yielding a more accurate measurement due to the statistical error averaging of the fit.

Eq. 1 and Eq. 2 show how the matrix M connects the sensor coordinate system (in which frequencies are determined) to the coordinate system in which the velocity must be determined. However in most applications the velocity measurement is remote/contactless, and therefore the sensor's coordinate system is not fixed to the velocity coordinate system.

As described above, in the speed-over-ground application, it is the goal is to measure the two-dimensional velocity vector of the vehicle with respect to the road. Hence in principle two sensors are required to measure $v_{forward}$ and $v_{lateral}$ of the car. In the application, two sensors are aimed downwards, looking at the surface under different azimuthal angles. As described by Eq. 1, the velocity vector is projected (with a proportionality constant) onto the 'frequency' plane spanned by the two sensors.

However, it was found that due to actions of the suspension system such a system cannot determine the two-dimensional velocity vector of the car with very high accuracy. Actions of the suspension system change the orientation of both coordinate systems in an unknown and uncontrollable way, and directly influence the measurement.

With three laser sensors, the two dimensional velocity vector can be determined in a three dimensional world. The extra laser sensor is not used to improve the accuracy, by statistical averaging, yet to make the measurement insensitive to misalignment of the frequency and the velocity coordinate axes to the first order, which increases the accuracy in the application much more than statistical averaging would. Adding a sensor, Eq. 2 becomes $$\begin{pmatrix} v_{forward} \\ v_{lateral} \end{pmatrix} = \begin{bmatrix} M_{11}^{-1} & M_{12}^{-1} & M_{13}^{-1} \\ M_{21}^{-1} & M_{22}^{-1} & M_{23}^{-1} \end{bmatrix} \begin{pmatrix} f_1 \\ f_2 \\ f_3 \end{pmatrix}$$

The inverse of matrix M can be easily determined by writing down the angular configurations in the three dimensions spanned by the three laser sensors, and determining the inverse of this square matrix. Only the first two rows of the resulting square matrix are required to determine the two-dimensional motion of the target. However, if the orientation of the sensor with respect to both the forward direction and the surface, there is still an ambiguity in the distinction between the usual forward velocity and additional lateral components, arising, e.g. due to a steering action.

In particular, if the sensor orientation with respect to the heading direction is known, the signals of the lasers contain redundant information. As multiple lasers are used and the angles of interest are known (for instance due to calibration or by storing information about previous operation, or self-calibration), then these lasers provide, at least in part, redundant information of the velocities to be sensed. For a non-coupled array of sensing lasers, the speckle pattern seen by each laser is independent of that of the other lasers. As a result of this, the observations are independent and simple combination of the independent observations can reduce the overall rms error, in proportion of the square root of the number of combined observations.

Specifically, as the angles of each laser beam with respect to the surface and the heading directions are determined, the velocity components for a movement along the surface, in particular along the heading direction can be determined from each laser beam which has a direction component along the movement.

This is in contrast to a vector addition, where each laser provides one component of the velocity vector. Thus, in contrast to a determination of a velocity vector by simple vector addition of the motion signals of the beams, a considerably enhanced accuracy can be achieved as the velocity signals can be combined to obtain a more accurate velocity signal. The invention therefore proposes a laser self-mixing velocity sensor for determining the velocity along a predetermined direction of a surface moving along the laser self-mixing velocity sensor is provided, comprising a laser device unit with at least one laser mounted therein. The laser device generates at least three laser beams emitted under monolithically fixed angles with respect to each other. Each of the laser beams are directed obliquely towards the surface and each of the at least three laser beams are emitted with different azimuthal angles, measured, e.g. with respect to the heading direction. The laser self-mixing velocity sensor further comprises circuitry for determining the frequency of self-mixing intensity oscillations caused by Doppler-induced phase shift of the laser light of each of the at least three laser beams reflected back from the surface and re-entering the cavity of the at least one laser. Further, to derive a more accurate velocity measurement, a circuitry for determining the velocity along the predetermined direction from the self-mixing intensity oscillations is provided which comprises circuitry for redundantly determining the velocity along the predetermined direction from the self-mixing oscillations of each of the at least three laser beams, and circuitry for calculating the velocity along the predetermined direction from the measurements of the velocity from said at least three laser beams.

Of course, the velocity value may not be the velocity itself, but also a signal representative thereof, such as a frequency or voltage proportional to the velocity.

Specifically, the redundant determination means that due to the known orientation of the laser device unit, the velocity along the predetermined direction can be extracted from each of the laser beams and the results then can be combined. The predetermined direction may be the heading or forward direction, as well as a direction laterally thereto. In particular, both a forward velocity along the heading direction as well as a lateral velocity can be determined from each of the laser beams simultaneously.

For the purpose to provide a laser beam arrangement with known orientation and fixed angles, the invention further provides a laser self-mixing velocity sensor for determining the velocity along a predetermined heading direction of a surface moving along the sensor, comprising
 a laser device unit with at least one laser mounted therein, the laser device generating
 at least three laser beams emitted under monolithically fixed angles with respect to each other. Each of the laser beams are directed towards the surface and each of the at least three laser beams have different azimuthal angles.

The laser self-mixing velocity sensor further comprises circuitry for determining the frequency of self-mixing intensity oscillations caused by Doppler-induced phase shift of the laser light of each of the at least three laser beams reflected back from the surface and re-entering the cavity of the at least one laser, and circuitry for determining the velocity along the heading direction from the self-mixing intensity oscillations.

The laser self-mixing velocity sensor also comprises circuitry for detecting a deviation of the actual sensor orientation from a reference orientation of the laser self-mixing velocity sensor with respect to the heading direction. The deviation is detected by comparison of the self-mixing oscillation frequencies of at least two of the at least three laser beams or parameters derived from the self-mixing oscillation frequencies of this two laser beams. A parameter derived from a self-mixing oscillation frequency may, e.g, be a velocity component corresponding to the respective self-mixings oscillation frequency.

Further, circuitry is provided for compensating the deviation in the frequency of the self-mixing signal of at least one of the at least three laser beams resulting from the deviation.

This way, exact values of the forward velocity are obtained and exact values of the lateral velocity can be calculated likewise.

It was found that the relationship between the three Doppler frequencies and the forward and lateral velocity is, to the first-order independent from angle variations of this multiple-axes system. The vertical velocity, being defined as the time-derivative of the distance of the sensor to the moving surface, e.g. determined by the height of the vehicle above the road, can be determined by at least three sensors too, yet still is influenced by vibrations, suffering from the predetermined velocity in the first order.

The laser self-mixing velocity sensor may comprise three laser diodes, each of the three independent laser diodes generating one of the at least three laser beams. According to this embodiment, the self-mixing oscillations can be detected independently for each laser, thereby facilitating the assignment of the intensity oscillations to the respective laser beams.

Instead of using a multiple-axes laser system with a multitude of lasers, it is also possible to split and deflect one single laser beam by, for instance, one or more prisms or gratings. Thus, according to a refinement of the invention, the laser self-mixing velocity sensor comprises a beam splitter which generates at least two of the at least three laser beams from a single laser.

In this case, the laser power fluctuates with two or more Doppler frequencies at the same time. Again, the relationship between these Doppler frequencies have the surprising result that the forward and lateral velocity becomes independent from angle variations due to action of the car suspension. Although in this embodiment the self-mixing signals are superpositioned in the laser intensity, a single laser is on the other hand advantageous in that the wavelength of the single laser can be stabilised more easily.

The deviation from a reference orientation may be easily determined by circuitry for detecting a deviation from a reference orientation of said laser self-mixing velocity sensor that comprises circuitry for comparing the self-mixing oscillation frequencies, in particular for detecting the difference between the self-mixing oscillation frequencies of two of the at least three laser beams or parameters derived from the self-mixing oscillation frequencies of this two laser beams. For example, if two of the lasers include the same amount of azimuthal angle with respect to the reference heading direction, a deviation of the actual heading direction from this direction results in different azimuthal angles according to amount. Thus, the self-mixing Doppler induced frequencies will slightly differ. Specifically, a smaller azimuthal angle results in a higher self-mixing oscillation frequency. In first order, the difference between both frequencies is directly proportional to the angle of rotation of the sensor with respect to the reference orientation.

The azimuthal angles between the three laser beams measured with respect to the perpendicular of the moving surface are preferably at least 60°, particularly preferred about 120° to provide a high sensitivity for displacements laterally along the surface.

Considering the exact angular configuration, it has been further found that it is advantageous when a laser beam hits the road in such a way that a surface as large as possible is illuminated by the laser beam. Moreover, the angles between the three or more laser beams should be such that the beams together span as much as possible of the half-sphere, defined by the viewing angles from the car body work to the road. In this way the influence of measurement error of the Doppler frequency is minimized. Furthermore, the frequency of speckle oscillations reduces for larger polar angles. To provide large viewing angles and a large illuminated surface area, at least one or more preferably each of the at least three laser beams is emitted under a polar angle of at least 60° measured with respect to the normal of the surface.

According to a refinement of the invention, the laser self-mixing velocity sensor may emit a further laser beam along the normal direction of the surface. Again, this laser beam may be split from another laser beam or may be generated by a separate laser. The addition of an additional laser beam along the normal or the center axis of the other laser beams, such as in particular the center axis of laser beams in a tripod configuration can further support error detection and compensation.

The particular advantage of such a further beam is the high signal that can be expected for a reflection into such a beam, so that the phase of the self-mixing signal of the center beam can be tracked accurately. Of course in the above example, this beam should not report any displacement as the heading direction is perpendicular to this beam. Only the random phase walk due to speckle transitions will cause self-mixing intensity fluctuations if the movement has only components along the surface. Thus, if any Doppler related self-mixing intensity oscillation is found on this axis, this is a direct indication of a mounting error.

However in many systems there actually are components of motion in more than one dimension, for instance due to vibrations. Such unwanted motions will be detected by all beams and for instance the perpendicular beam is able to detect vibrations with high sensitivity. This is for instance useful in printer application where vibration of the paper during the linear transport causes additional height fluctuation of the paper. The detected vertical velocity may in this regard advantageously be used to correct the value of the lateral velocity. A vertical movement also influences the measurement of the lateral velocity since the laser beams have vertical direction components. Thus, according to a further refinement of the invention, the laser self-mixing velocity sensor comprises circuitry for determining a vertical movement along the normal of said surface from the self-mixing oscillations of at least one of the laser beams, and circuitry for compensating lateral velocity components induced by the vertical movement in the measured lateral velocity.

Laser self-mixing devices can provide displacement measurements with extremely high accuracy. The relative measurement error is inversely proportional to the distance covered and for short distances (on the order of 1 meter) between sensor and the object moving with respect to the sensor it can be less than 0.01%. The error is proportional to a root mean square addition of the phase uncertainties at Speckle transitions since these phase uncertainties are uncorrelated. This leads to the following formula for the relative error for a typical phase uncertainty of 180 degrees:

$$\mathrm{err} = \lambda \ast \sin(\alpha)/(L/L_{speckle})^{1/2}/L,$$

where $\lambda$ is the laser wavelength, $\alpha$ is the angle of the light with respect to the direction of motion, L is the displacement and $L_{speckle}$ is the average Speckle size. For typical numbers of $\alpha=30$ degrees, $\lambda=850$ nm, L=1 m and $L_{speckle}=20$ μm, this results in an error of about 0.01%.

According to a simple refinement of the invention, the velocity values may be averaged by appropriate circuitry to derive a more accurate motion report.

According to a further aspect of the invention, however, use can be made of the property of the random phase jumps at speckles in the sense that the displacement measurements tend to be accurate for most of the time (usually at least 80% of the time) and then sudden, brief (jump-like) deviations occur at Speckle interfaces. At these interfaces the reported speed deviates strongly from previous speed and following speed since speed is displacement derivative versus time, where displacement is indicated by the phase of the speckle signal. Furthermore, the signal intensity collapses and reappears at speckle interfaces.

Using these properties is possible to detect these transitions and extrapolate through them. Since speed reports are mostly correct, this means that the errors due to phase jumps at Speckle interfaces can be reduced by almost an order of magnitude for each laser that is added. Thus, these errors do not longer dominate system performance if data of multiple lasers are compared. Thus, according to one embodiment of the invention, a laser self-mixing device with multiple laser beams, preferably in a tripod configuration is proposed which further comprises circuitry for detecting phase jumps or minima of the self-mixing Doppler induced intensity oscillation of at least one of the at least three laser beams at interfaces of speckle induced intensity oscillations and circuitry for correcting a deviation of a signal derived from the frequency of the Doppler induced intensity oscillation at the interfaces of speckle induced intensity oscillations, the deviation resulting from the phase jumps.

Thus, according to a further aspect of the invention, a laser self-mixing velocity sensor for determining the velocity moving relative to a reference surface is provided, the sensor comprising
  at least two, preferably at least three lasers,
  circuitry for determining the frequency of self-mixing intensity oscillations caused by Doppler-induced phase shift of the laser light reflected back from the surface and re-entering the cavity of the at least one laser,
  circuitry for determining the velocity along at least one predetermined direction from said self-mixing intensity oscillations, and
  the above mentioned circuitry for detecting phase jumps or minima and for correcting a deviation. This embodiment of the invention is independent from the calibration of the sensor orientation or a correction of a misalignment, respectively. Thus, according to a further aspect of the invention, the multiple laser verlocity sensor may be employed with or without circuitry for determining the orientation of the sensor in relation to the reference surface.

Furthermore, when multiple lasers are available with redundant information, then the information of all these sources can be processed simultaneously and the sources are selected in dependence of the reliability of the information. For this purpose, the circuitry for correcting the deviation of a velocity signal at the speckle interface can comprise circuitry for selecting between at least two velocity signals derived from the at least three laser beams, whereby this circuitry rejects a velocity signal if a speckle interface in its corresponding self-mixing intensity oscillation is detected.

Furthermore, in the signal processing, mathematical weighing functions may be used, different from simple selection of a displacement source, where the weighing factor results from evaluating the source signals. The weighting function can in particular be applied by appropriate circuitry to eliminate errors in velocity determination at speckle interfaces. Thus, according to a refinement of the invention, circuitry is provided for weighting velocity values of at least one of the at least three laser beams and calculating a velocity value from the weighted velocity, thereby achieving a considerable enhancement in accuracy.

For example, if three velocity values are obtained, the velocity values may be weighted in dependence of their deviation from a mean value calculated from the three velocities with the lowest weighting factor being assigned to the velocity value having the largest deviation. The value of the velocity along the predetermined directions is then calculated from the weighted values. With regard to the weighting of the velocity values, it is not mandatory to determine speckle interfaces since the weighting function can apply a low weight to the respective velocity signal influenced by a speckle interface. Moreover, the mean or reference value can be calculated in various ways, e.g. by averaging previously determined velocity values.

A further possibility is to apply weighting factors or a selection of the velocity values in dependence from the amplitude or phase of the self-mixing oscillations. Thus, the weighing functions or source selection can be based on a comparison of phase derivative throughout a Speckle transition to the average phase derivative (=speed) when there is no Speckle transition.

Additionally or alternatively, the weighing functions or source selection can be based on determining the self-mixing signal amplitude, which goes through a minimum in Speckle transition.

Furthermore, one possibility to extrapolate through speckle interfaces is to employ circuitry which delays the signal processing and uses data from before and after Speckle transitions to determine the actual velocity value in the vicinity of a speckle transition. In particular, this extrapolation can be performed in response to a detection of a speckle interface by the circuitry for detecting phase jumps or minima of the self-mixing Doppler induced intensity oscillation of at least one of the at least three laser. Generally, the wavelength of low-cost semiconductor lasers is not stable; a wavelength drift on the order of 0.08 nm/° C. can be expected in practice for an 800 nm source, or 0.01% per ° C. Thus the system error can also be dominated by thermal drift.

This can be solved by adding a cooler element and thermistor to stabilize the laser wavelength, as is commonly done in other laser applications. However, this is orders of magnitude more costly than the laser self-mixing sensor itself and therefore another solution is sought. For the case of lasers where the mode is locked by a frequency selective element, such as a grating, the laser wavelength is largely determined by that element. This element in turn is commonly integrated in the laser crystal and it is the detuning of this element that is largely responsible for the wavelength drift. Therefore the wavelength drift is generally predictable and using the known relation between displacement reports and laser wavelength a mathematical compensation of the temperature drift of the sensor is possible. This does require measurement of the sensor temperature, such as using a thermistor or by using the sensor itself to measure temperature. It should be noted that another factor affecting laser wavelength is the laser current. The laser current heats the laser beyond the ambient temperature which alters the carrier concentration in the device that affects the crystal refractive index which also determines the laser wavelength. Thus when the laser current is not constant, compensation can advantageously also include the laser current.

Another method to determine thermal drift is to include a reference surface in the optical path of one or more laser beams. When the laser is modulated such a surface causes undulations (also see other self-mixing patents) and the phase and frequency of these undulations will shift as the laser temperature changes. Thus measurement of phase and/or frequency by using a reference surface in an optical alignment can be used to support sensor accuracy. Furthermore, when the reflection from an external surface is strong enough then it can be used to lock the laser mode to a more precise frequency, for instance in an external cavity laser, to improve wavelength stability.

It is therefore generally advantageous to include circuitry for measuring the temperature (direct or indirect, e.g. by a reference surface) of the laser and circuitry for correcting the velocity signals in dependence of the wavelength shift induced by the temperature drift, or in dependence of the measured temperature, respectively.

The circuitry for determining the frequency of self-mixing intensity oscillations caused by Doppler-induced phase shift preferably comprises negative feedback circuitry, in particular a phase-locked loop-circuit (PLL) and/or a frequency-locked loop-circuit (FLL). These circuits may in particular perform a quadrature amplitude demodulation. With respect to the invention, these circuits are advantageous, as the feedback signal for the Doppler rotation frequency for the FLL or PLL can be based on processing the signal of all sources into a more accurate speed. This way, the feedback values are already corrected and thus a very exact feedback signal is generated. Thus, according to a further embodiment of the invention, the circuitry for determining the frequency of self-mixing intensity oscillations caused by Doppler-induced phase shift includes a phase-locked loop or frequency-locked loop circuit (or more generally a negative feedback circuit) and circuitry for generating a feedback signal from a combination of the self-mixing Doppler induced frequencies obtained from at least two of the at least three laser beams.

To correct the measured data of a laser self-mixing sensor with three laser beams, the inventive method further advantageously comprises determining the orientation of the sensor by at least a second laser beam and a third laser beam being emitted in linear independent directions with respect to each other and the first laser beam and the velocity data are adjusted by means of a coordinate transformation which aligns the orientation of the sensor to be parallel to the reference surface.

As well, —independent from the number of laser beams employed—, a vertical component of velocity may be compensated. For this purpose, the orientation of the sensor is determined by including a measurement of the vertical velocity of the vehicle perpendicular to the reference surface. The velocity data are then adjusted by means of a coordinate transformation so that the adjusted average vertical velocity is zero.

There are several possibilities of determining the predetermined direction of movement of the vehicle, particularly the forward direction. According to one refinement of the invention, additional sensors are employed to determine this direction. Suitably, a steering wheel sensor, an acceleration sensor for measuring lateral accelerations, or a compass may be used. It is also possible to compare rotation speed data of wheel speed sensors.

The predetermined direction may be even determined without external sensors. As a vehicle in average drives most of the times straight ahead, an average of the velocity data comprising the information of the direction may be calculated. Thus, the average value of the directions then represents the predetermined direction of movement.

Alternatively or in addition, the calibration as proposed according to the invention may be made dependent from the measured velocity values. Usually, the faster a vehicle drives, the smaller are steering wheel movements. Thus, generally the ratio of lateral components to the forward velocity is smaller at higher speeds. It is therefore advantageous, if the step of obtaining velocity data for a movement of the vehicle along the predetermined direction of movement for calculating adjustment parameters is carried out in response to the excess of a predetermined velocity. As well, if, at a given forward velocity the lateral velocity becomes small or close to an average value, it can be assumed as well that the vehicle drives straight ahead. Accordingly, in both cases, the step of obtaining velocity data for a movement of the vehicle along the predetermined direction of movement is carried out in response to the measurement of a velocity component exceeding or falling below a predetermined threshold.

The determination of the transformation may be accomplished by
  determining a first transformation that aligns a plane of the sensor coordinate system parallel to the reference surface, and
  determining a second transformation which rotates the plane of the sensor coordinate system around its perpendicular direction so that the amount of the lateral velocity is minimised. The first transformation may be based on distance measurements, or measurements of the velocity perpendicular to the reference surface, respectively, obtained from three lasers.

Accordingly, the step of calculating a transformation based on the velocity data for a movement of the vehicle along the predetermined direction of movement may advantageously comprise the steps of
  determining the three distances between laser and the reference surface and calculating a transformation from the three distances, wherein the transformation aligns the velocities in the center coordinates to the velocities of the reference surface. The distance of the reference surface to the respective laser can be easily determined by applying a modulation to the laser wavelength and measuring the resulting self-mixing oscillation. The modulation of the laser wavelength can be achieved by modulating the laser current. Among other effects, a modulation of the laser current results in a modulation of the laser power and coming along therewith, the temperature of the laser cavity. The laser wavelength then changes in response to the temperature dependent cavity length.

The rotation of the second transformation is advantageously carried out so that the average lateral velocity is zero.

A further possibility for determination of the transformation is to
  determine a first transformation which minimises the component of the forward velocity in the direction of the sensor coordinate system perpendicular to the reference surface or the amount of the velocity perpendicular to the reference surface,
  determining a second transformation which minimises the component of the lateral velocity, and
  determining a third transformation which minimises the correlation between the lateral and perpendicular components of movement.

With the third transformation, a tilt around an axis along the actual forward direction is compensated, which is hard to carry out by other means, since both components are small most of the time, and hence the 'cross-talking' is negligible.

In both cases, the transformations are combined to obtain the overall transformation applied to subsequently measured data.

It is generally advantageous, if the calibration according to the invention is carried out more than once, since the orientation of the sensor with respect to the forward direction may change eventually, e.g. by the amount and distribution of the load the vehicle is transporting.

13

Depending on the mounting position, the orientation of the sensor with respect to the vehicle may change eventually. For example, if the sensor is mounted in the bumper of a car, the bumper may be deformed due to an impact. Moreover, the orientation of the chassis as a whole will change if wheels will loose their proper alignment causing a slightly rotated forward driving direction. Depending on the load distribution (passengers, caravan, full vs. empty fuel tank), the car might nick forward, backward, or sidewards. All these long term variations (long with respect to the sensor's typical output rate of <10 ms) can be compensated for by a proper calibration. For example, a calibration can be carried out in regular intervals and/or each time, the vehicle exceeds a predetermined velocity.

It shall be understood that a preferred embodiment of the invention can also be any combination of the dependent claims with a respective independent claim.

BRIEF DESCRIPTION OF THE DRAWINGS

These and other aspects of the invention will be apparent from and elucidated with reference to the embodiments described hereinafter. In the following drawings:

FIGS. 12 and 13 flow charts of two embodiments of calibration routines.

DETAILED DESCRIPTION OF EMBODIMENTS

In the claims, the word "comprising" does not exclude other elements or steps, and the indefinite article "a" or "an" does not exclude a plurality.

The mere fact that measures are recited in mutually different dependent claims does not indicate that a combination of these measures cannot be used to advantage.

A single unit or device may fulfil the functions of several items recited in the claims. The mere fact that certain measures are recited in mutually different dependent claims does not indicate that a combination of these measures cannot be used to advantage.

Determinations, calculations et cetera by one or several units or devices can be performed by any other number of units or devices. The method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the internet or other wired or wireless telecommunication systems.

The reference signs in the claims should not be construed as limiting the scope of these claims.

Figure 1:
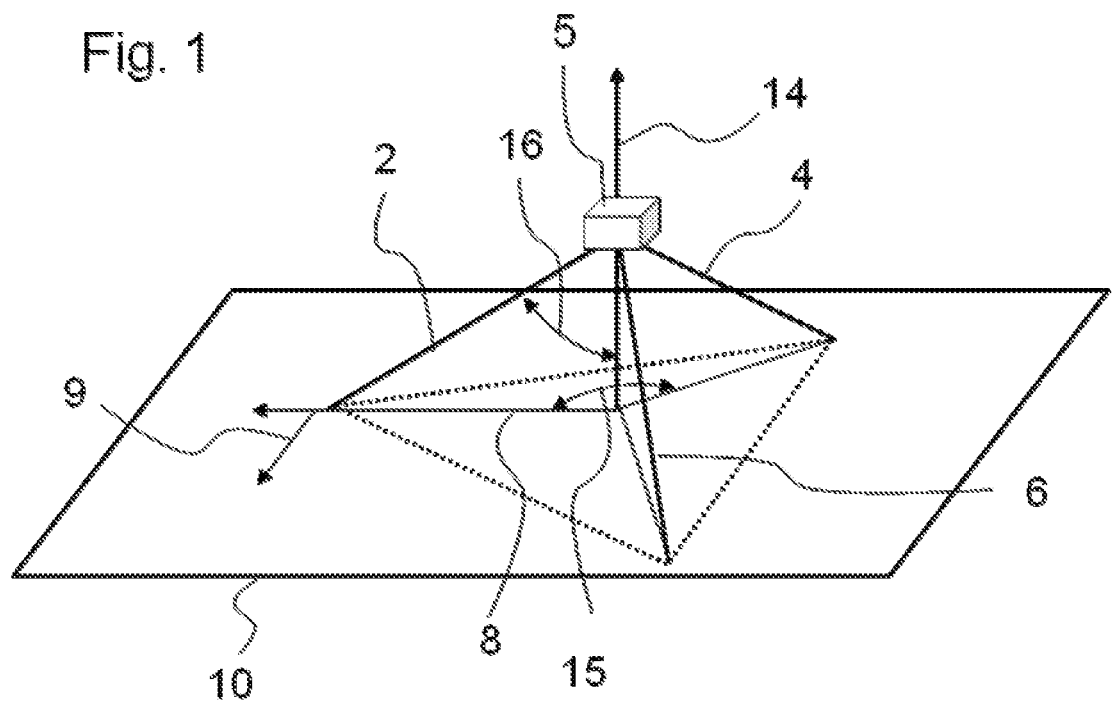
FIG. 1 shows a perspective view of a geometrical arrangement of the laser beams with respect to a moving surface.

FIG. 1 shows the arrangement of the preferred embodiment of the invention with three laser beams 2, 4, 6 with respect to a moving surface 10. The surface 10 predominantly moves along a forward direction 8 relatively to the laser device unit 5 which generates the laser beams 2, 4, 6 which are emitted under monolithically fixed angles with respect to each other and obliquely towards the surface 10.

All laser beams 2, 4, 6 are emitted under different azimuthal angles, measured with respect to a direction along the surface, e.g. with respect to the forward direction 8. The azimuthal angle 15 between the forward direction 8 and beam 4 is shown in FIG. 1. In the embodiment of FIG. 1, the projection of laser beam 2 extends along forward direction 8 so that the azimuthal angle between this beam and the forward direction 8 is zero.

Additionally to the movement along forward direction 8, lateral movements along lateral direction 9 may occur eventually, for example if the vehicle drives a curve. This movement is typical for systems like vehicles which predominantly move along a heading direction. In the case of a vehicle, the sensor according to the invention can in particular be used as a speed over ground sensor which is also the most preferred application of the invention.

Further, the beams are directed obliquely towards the surface 10 so that the beams 2, 4, 6 have a component of direction along the surface 10. As can be seen from FIG. 1, the laser beams 2, 4, 6 form a tripod configuration due to the different azimuthal angles and the oblique direction with respect to the normal 14 of the surface 10.

Specifically, it is in this regard advantageous, if the polar angle 16 is large, preferably at least 60°. The large polar angle not only increases the Doppler induced phase shift of the light reflected back along the respective beam but also reduces the speckle effect since a larger surface area is illuminated by the beams so that speckle related phase shifts are partly averaged.

If the orientation of the laser sensor with respect to the forward direction 8 and the surface 10, is known, the polar angles 16 and the azimuthal angles of the beams are determined. In this case, the forward velocity along forward direction 8 can be extracted from each of the beams since the directions of all beams 2, 4, 6 have a component along forward direction 10. The results then can be combined to obtain a more accurate result of the velocity. For example, the motion reports from the three laser beams may be simply averaged.

As well, a lateral velocity, e.g. due to a lateral drift of a car in a turn can be calculated from the signal of each of the lasers. The determination of the velocity is performed by circuitry for determining the frequency of the self-mixing intensity oscillations caused by the Doppler-induced phase shift of the laser light reflected back from the surface and circuitry for redundantly determining the velocity along the predetermined direction, i.e. forward direction 8 from the self-mixing oscillations of each of the laser beams 2, 4, 6, and circuitry for calculating the velocity along the predetermined direction from the redundant measurements.

However, inter alia due to a mounting inaccuracy, the actual sensor mounting orientation may deviate from the reference orientation. In the example of FIG. 1, the reference orientation is defined by a beam pointing exactly along the forward direction 8 with the center axis of the tripod configuration being coincident with the surface normal.

Figure 2:
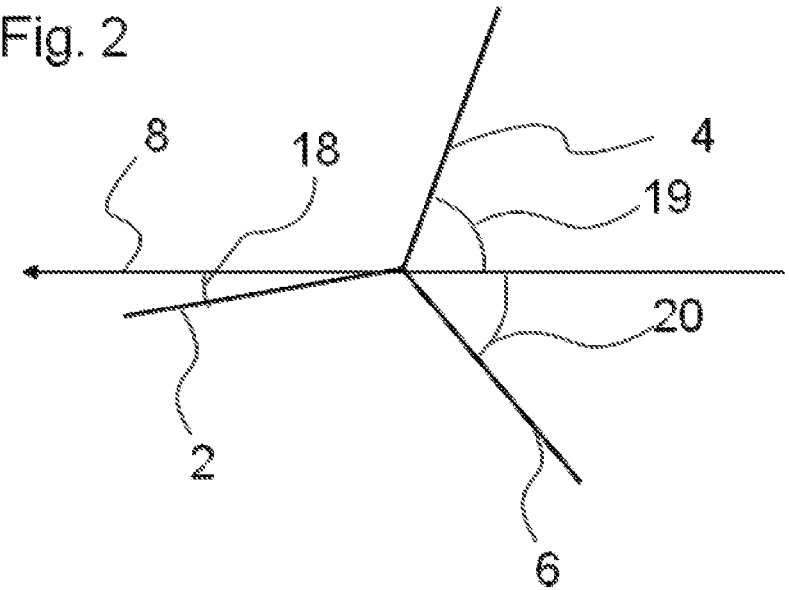
FIG. 2 shows a top view of the arrangement with a rotational misalignment with respect to the forward direction.

As an example, FIG. 2 shows a top view onto the arrangement with a rotational misalignment of the sensor. As can be seen from this figure, the laser device unit is rotated by an angle 18 with respect to the reference orientation where the azimuthal angle between laser beam 2 and forward direction is zero or where the projection of laser beam 2 onto the surface 10 coincides with the forward direction 8.

For a movement along the forward direction of laser beam 2 the difference of displacement reported by laser beams 4 and 6 is in first order proportional to this rotation by angle 18 of the sensor mount. Specifically, in the arrangement of FIG. 2, angle 19 between beam 4 and forward direction 8 is smaller than angle 20 between beam 6 and forward direction 8. Thus, laser beam 4 will report a higher forward velocity than beam 6 or will be modulated with a higher Doppler-induced self-mixing intensity oscillation frequency, respectively.

The measurement error caused by this rotational misalignment can advantageously be treated by circuitry for detecting a deviation of the actual sensor orientation from a reference orientation by comparison of the self-mixing oscillation frequencies, and circuitry for compensating the deviation in the frequency of the self-mixing signal of at least one of the three laser beams 2, 4, 6 resulting from the deviation. Specifically, if the rotation angle 18 is determined by comparison of the self-mixing frequencies of laser beams 4 and 6, the self-mixing frequencies or the corresponding velocity values can be corrected by appropriate factors resulting from the rotation. However, a mounting error needs to be distinguished from an actual lateral velocity as it, e.g, may occur if the vehicle drives along a bend.

Figure 3:
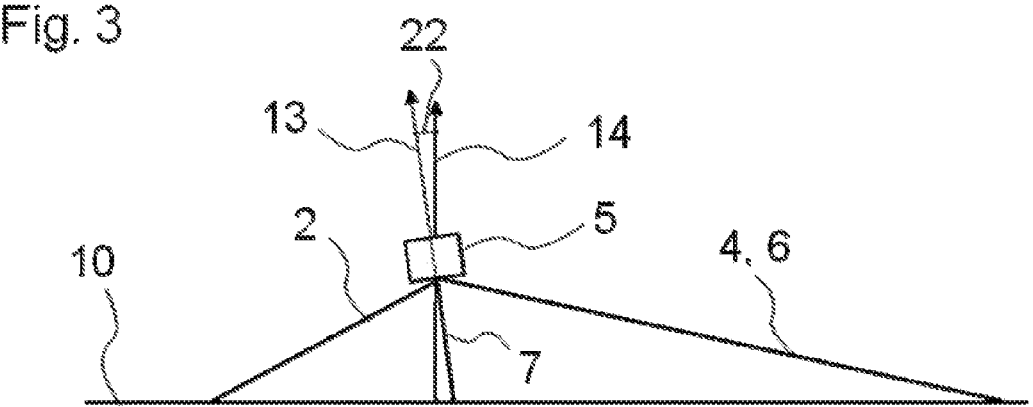
FIG. 3 shows a side view of the arrangement which is misaligned with respect to the normal of the moving surface.

Similarly, a misalignment as shown in the side view of FIG. 3 may be compensated. In this case, the center axis 13 of the laser device unit is tilted by an angle 22 with respect to a reference orientation along the surface normal 14. The comparison of displacement or velocity reported by beam 2 and that of beams 4 and 6 gives information about sensor tilt along the direction of motion. One or more of such measurements can be made and an error compensation for displacement reports can be generated. Inter alia, the tilt effects a mixing of the vertical and forward velocity. Thus, even without a vertical movement, e.g. due to chassis vibrations, a non-zero vertical velocity will be reported if the vehicle is moving along the forward direction. The compensation procedure according to the invention is described later with respect to FIGS. 7 to 13.

As shown in FIG. 3, the laser device unit of this embodiment generates an additional laser beam 7 along the center axis 13 of the tripod-like arrangement of laser beams 2, 4, 6 can further support error detection and compensation. As soon as the sensor and vice versa the additional laser beam 7 is tilted with respect to the normal 14 of surface 10, this laser beam will exhibit Doppler-induced self-mixing oscillations upon a lateral movement relatively to surface 10. Thus, if the oscillation signal of the additional laser beam 7 is correlated with the motion reports of the other laser beams 2, 4, 6, a tilt can be detected with high sensitivity.

Moreover, the further laser beam 7 directed towards the surface normal 14 is useful to detect vibrations, i.e. motions along the surface normal 14 with high sensitivity. This facilitates a correction of the velocity values obtained from self-mixing signals of the other laser beams which are influenced by the vibrations, as the directions of these laser beams also have components along the normal 14.

Figure 4:
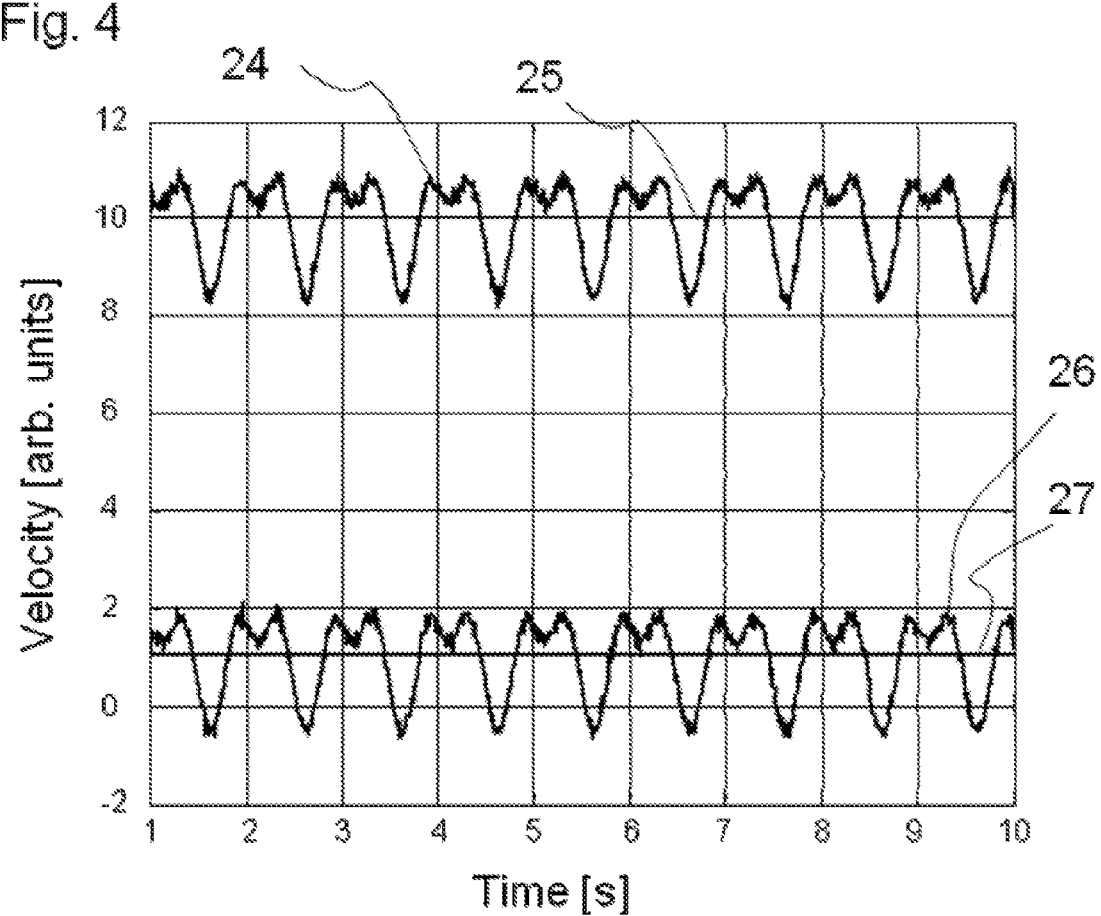
FIG. 4 shows a graph with simulations of measurements of forward and lateral velocities using a two-laser arrangement.
Figure 5:
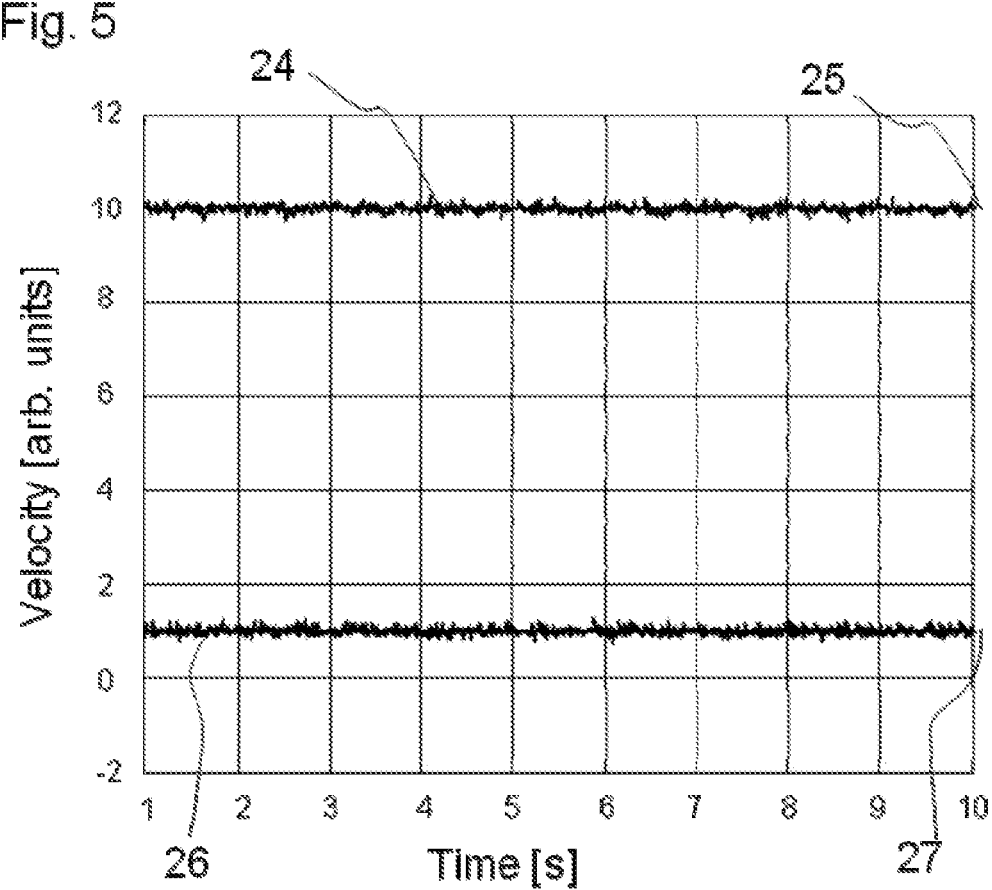
FIG. 5 shows a graph with simulations of measurements of forward and lateral velocities using a laser arrangement with three lasers as shown in FIG. 1.

FIGS. 4 and 5 show simulations of the measurement of the forward and lateral velocities. FIG. 4 shows the measurement using a two-laser arrangement, where the projection of one laser points along the forward direction and the projection of the other laser points along a direction perpendicular thereto.

Curve 24 shows the measured and curve 25 the actual (uniform) forward velocity. Curves 26 and 27 are the measured and actual (as well uniform) lateral velocities. Besides of a lateral movement, the sensor additionally vibrates perpendicularly to the surface. The vibrations are clearly visible in the measured signals, as the laser beams have components of direction perpendicular to the surface. In particular, as it is obvious from the curves, the measurement error is considerable.

In contrast thereto, a triple-laser beam configuration as exemplary shown in FIG. 1 allows to correct the deviations of the motion reports resulting from vibrations such as, e.g., vibrations of a car suspension with respect to the pavement. This is demonstrated in the simulated measurement of FIG. 5. Both the lateral and forward velocities are determined with high accuracy without any influence of the vibrational motion.

Figure 6:
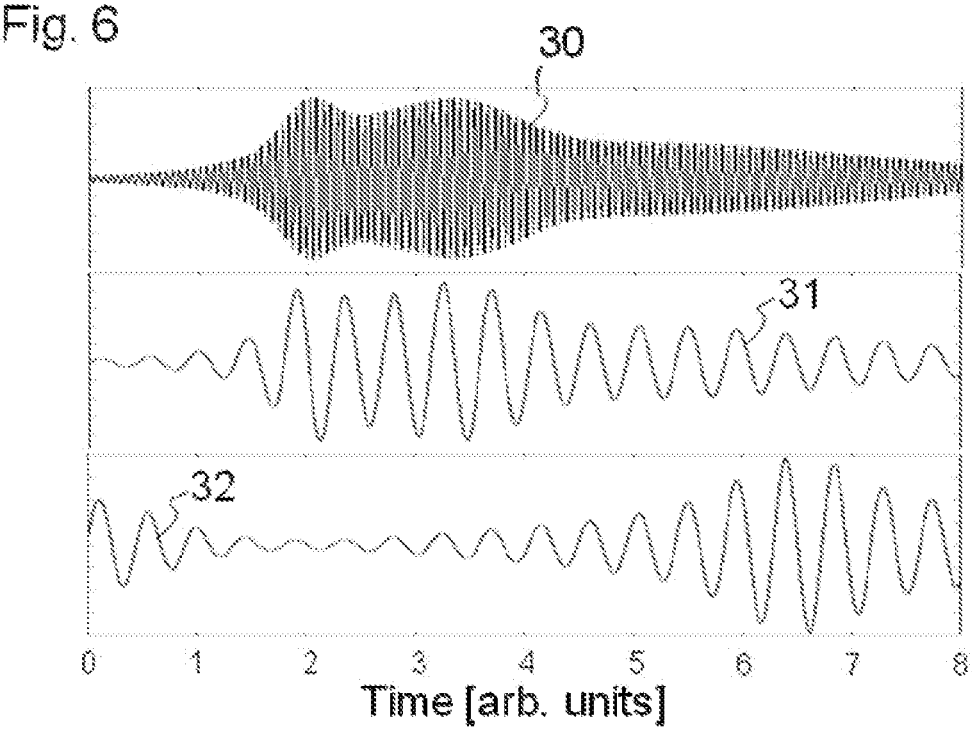
FIG. 6 shows three exemplary curves of the self-mixing intensity oscillation of the three lasers.

The measurement accuracy can be further enhanced, if the phase jumps at speckle transitions are detected and compensated. To illustrate this, FIG. 6 shows three exemplary curves of the self-mixing intensity oscillation of the three lasers. All self-mixing intensity oscillations are a superposition of a Doppler-induced regular oscillation and a speckle-related random oscillation of lower frequency. Curve 30 is the self-mixing signal of laser 2. This curve shows a Doppler-induced oscillation having a higher frequency than the other curves 31, 32 of laser beams 4 and 6, respectively. This is due to the fact that the projection of beam 2 onto the surface 10 points along the forward direction, whereas the projections of laser beams 4 and 6 extend obliquely thereto.

The interfaces of speckle transitions are characterised by a collapsing intensity of the self-mixing oscillations and a phase jump of the Doppler-induced oscillation. However, for the sake of simplicity, the phase jumps are not depicted in the curves of FIG. 6. Clearly, each of curves 30 and 31 exhibit a speckle interface at about time "0" on the time scale of FIG. 6, whereas the signal according to curve 32 has a speckle transition at time "2".

The speckle transitions can be easily identified by evaluating the oscillation amplitude and/or the phase of the Doppler-induced oscillation. Now, appropriate circuitry can correct the deviation of a velocity signal derived the frequency of the Doppler induced intensity oscillation at the interfaces of speckle induced intensity oscillations.

One possibility is to select among the signals of curves 30, 31, 32. Specifically, at time "0", the velocity is calculated only from the signal of curve 32 as the other curves exhibit speckle transitions so that the velocity value derived from curve 32 is expected to be more accurate. Likewise, at time "2", the velocity is calculated from both curves 30, 31, whereas the signal of curve 32 is omitted.

Another possibility is to apply a weighting function. For example, the weighting factors may be chosen according to the intensity of the oscillation. Thus, at time "0", the highes weight for calculation of the velocity would be assigned to curve 32, whereas at time "2", this curve would be included with the lowest weight for the calculation.

Figure 7:
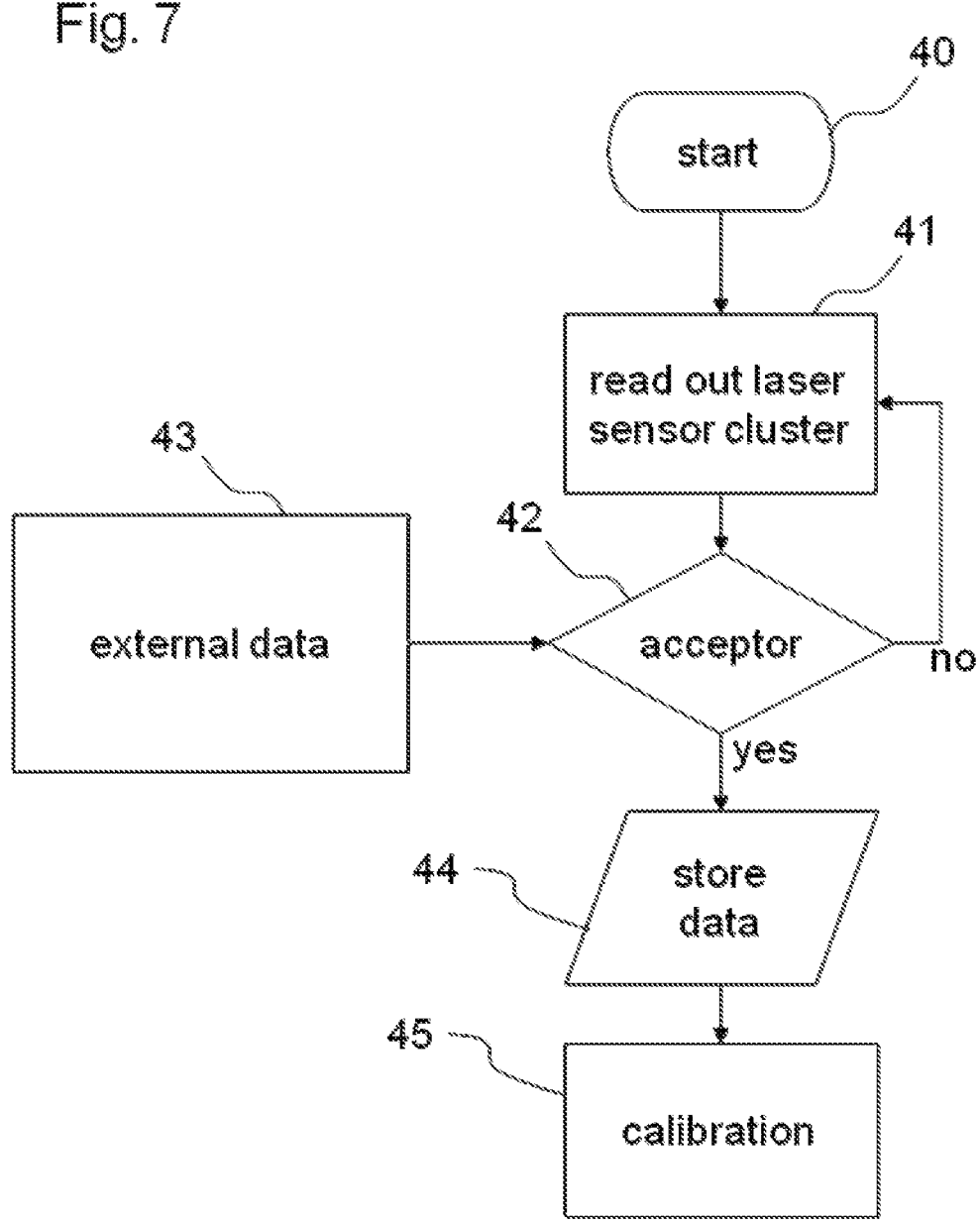
FIG. 7 shows a flow chart of a method of adjusting a self mixing laser sensor.

FIG. 7 shows a simplified flow chart of a procedure to adjust a self mixing laser sensor as, e.g., shown in FIG. 1. The procedure is based on the steps of determining the frequency of self-mixing intensity oscillations caused by Doppler-induced phase shift of the laser light of beams 2, 4, 6 reflected back from the surface and re-entering the cavity of the lasers,
    calculating a velocity from the frequency of self-mixing intensity oscillations, and
    determining the orientation of the sensor in relation to the reference surface and a predetermined direction of movement, being the forward direction 8 using the signals of the laser beams 2, 4, 6. The step of determining the orientation of the sensor comprises the steps of determining, whether the direction of movement of the vehicle coincides with a predetermined direction of movement, obtaining velocity data for a movement of said vehicle along said predetermined direction of movement, and calculating a transformation based on said velocity data for a movement of said vehicle along the predetermined direction of movement (i.e. the forward direction 8).

After the procedure shown in FIG. 7 has been carried out, the velocity data are adjusted using the transformation determined in the calibration procedure.

In step 40, the procedure is initiated. For example, the calibration procedure may be started upon starting the vehicle and/or after a predetermined time interval.

Then, in process 41, the laser sensors are read out to determine velocity signals from the self-mixing oscillations. The velocity signals are input to an acceptor routine 41. Within the acceptor routine 42, it is decided whether the measured velocity value can be assumed to coincide with the forward velocity along direction 8. As already stated above, the coincidence does not need to be exact. Rather, the acceptor routine 41 test one or more threshold conditions. Some advantageous possible routines are described below with respect to FIGS. 8 to 11. The routine may also employ external data 43, e.g. from steering wheel sensors, acceleration sensors, a compass, wheel rotation speed data, etc.

If the acceptor routine 42 confirms a coincidence, the data of step 41 are stored, step 44, and used for the calibration routine, step 45.

Figure 8:
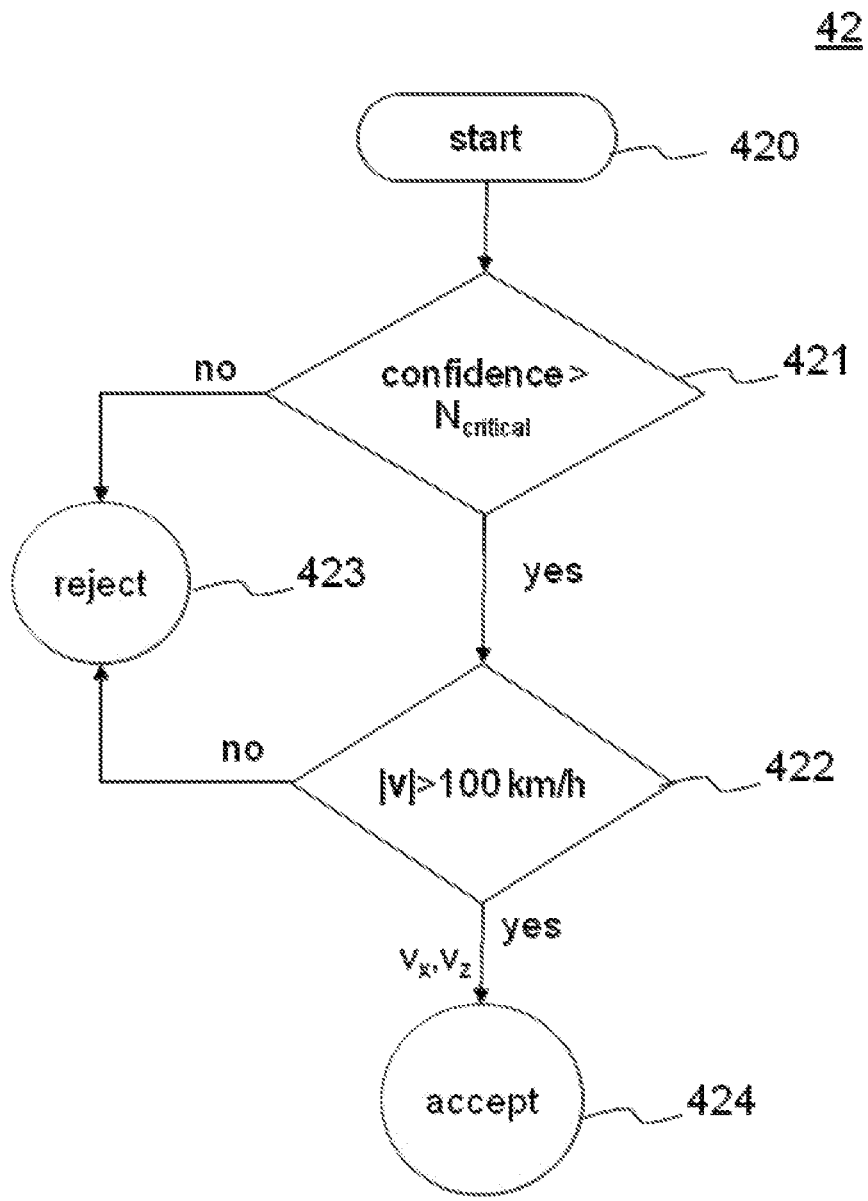
FIGS. 8 to 11 flow charts of acceptor routines.

FIG. 8 shows a first embodiment of the acceptor routine 42.

After the acceptor routine 42 has been started (step 420), e.g. in response to the start 40 of the procedure according to FIG. 7, a twofold test is performed in subroutines 421, 422. The decision subroutine 421 tests whether the data fulfil a confidence criterion. In particular, it may be tested whether enough data have been acquired to calculate an average velocity value having a sufficient statistical confidence value. Furthermore, in subroutine 422 it is tested if the velocity exceeds a predetermined threshold, e.g., 100 km/h. Each of the subroutines 421, 422 rejects the data, if the respective criteria are not met, step 423.

If both criteria of sufficient statistical confidence and sufficient speed are fulfilled, the data are accepted, step 424, and will be stored for calibration (step 44 in FIG. 7).

Figure 9:
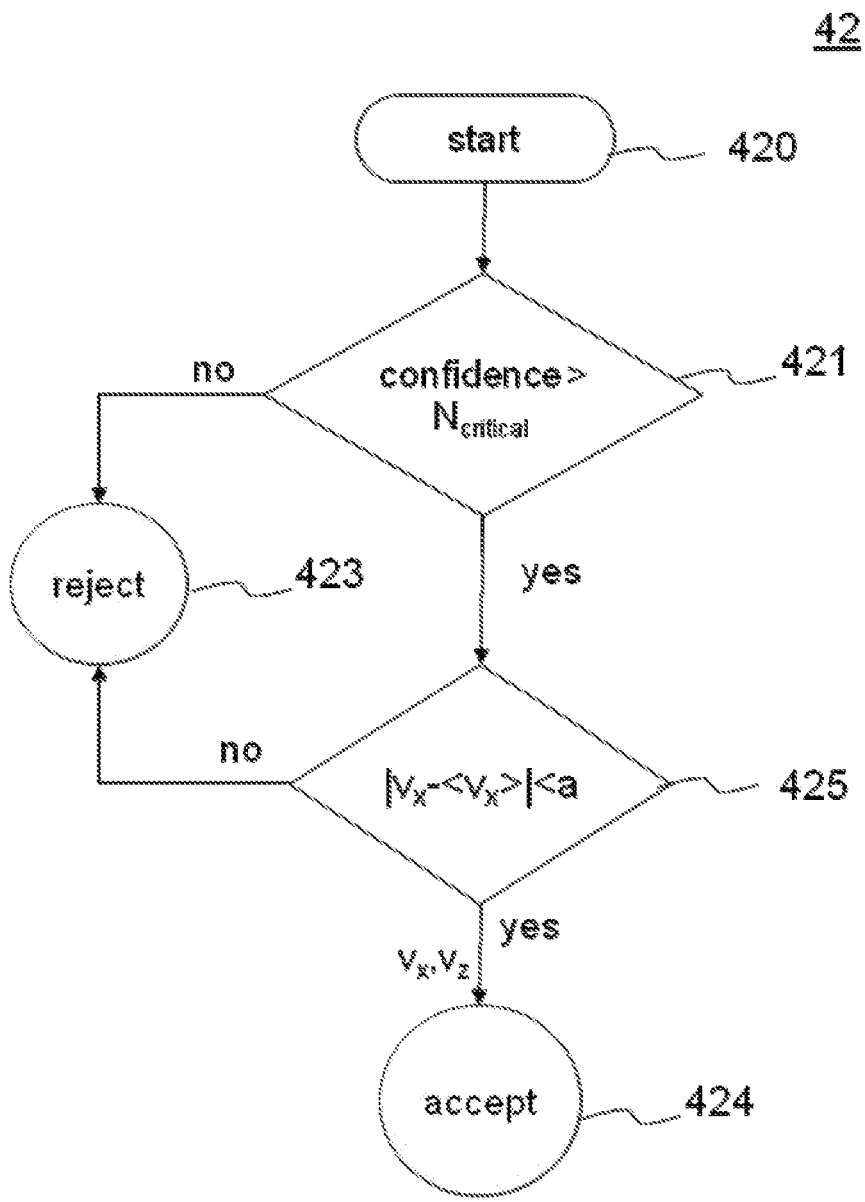

FIG. 9 shows a variant of the embodiment of FIG. 8. In this variant, a subroutine 425 is used instead of subroutine 422 of FIG. 8. Both subroutines 422, 425 are similar in that a velocity component is compared with a threshold value. However, in the subroutine 425, the circuitry determines whether the lateral velocity $v_x$ is sufficiently close to the average lateral velocity $<v_x>$. Specifically, it is evaluated whether the deviation $|v_x-<v_x>|$ is smaller than a threshold value a.

Figure 10:
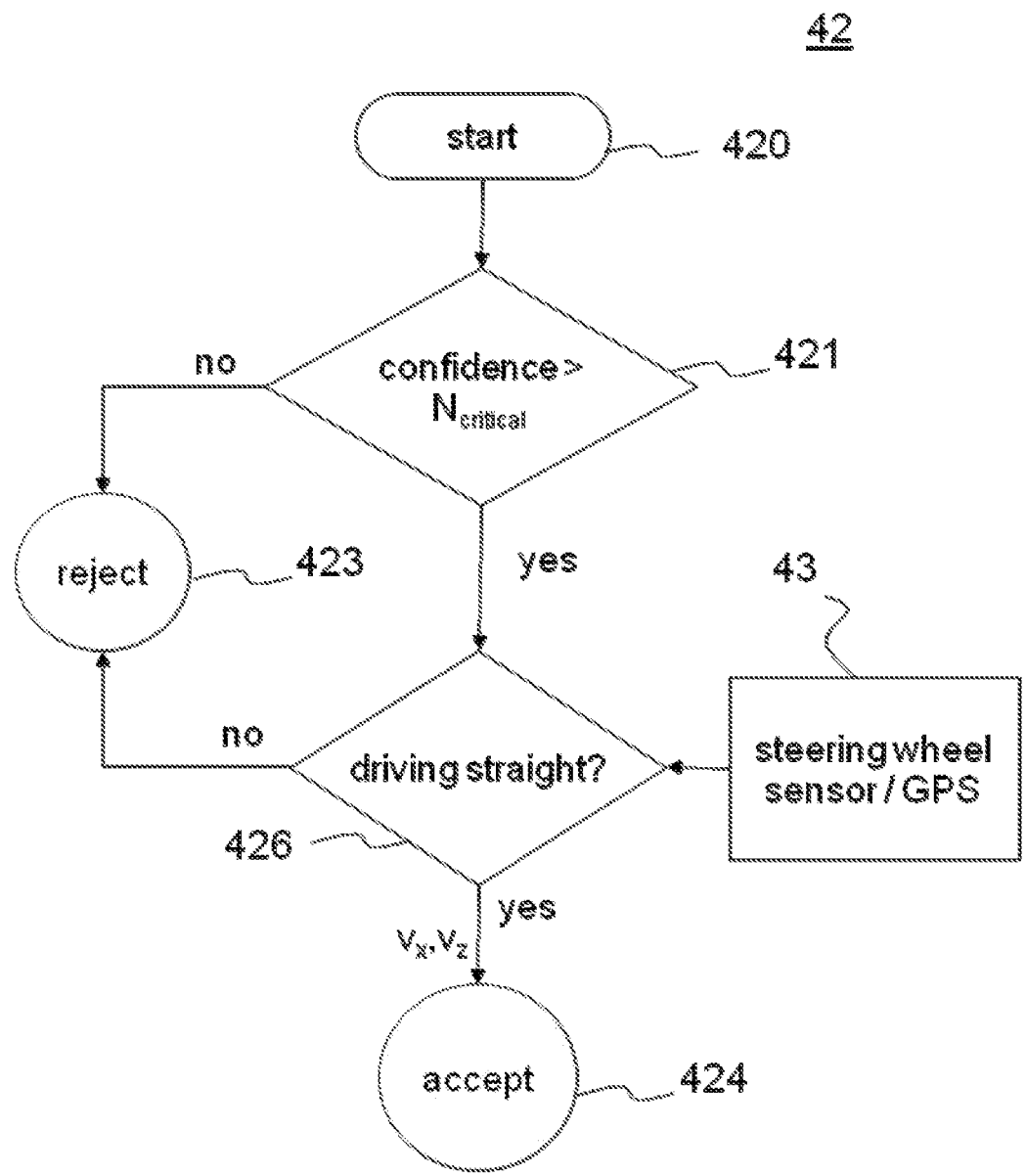

In the embodiment of FIG. 10, in addition to subroutine 421, a subroutine 426 is carried out which employs external data 43. For example, it is assumed that the vehicle is driving straight ahead if data from a steering wheel sensor indicate that the steering wheel is in neutral position. Another example may be the use of GPS data. If the GPS-data indicate a straightforward movement, the data are accepted if also the confidence condition tested in subroutine 421 is met.

Figure 11:
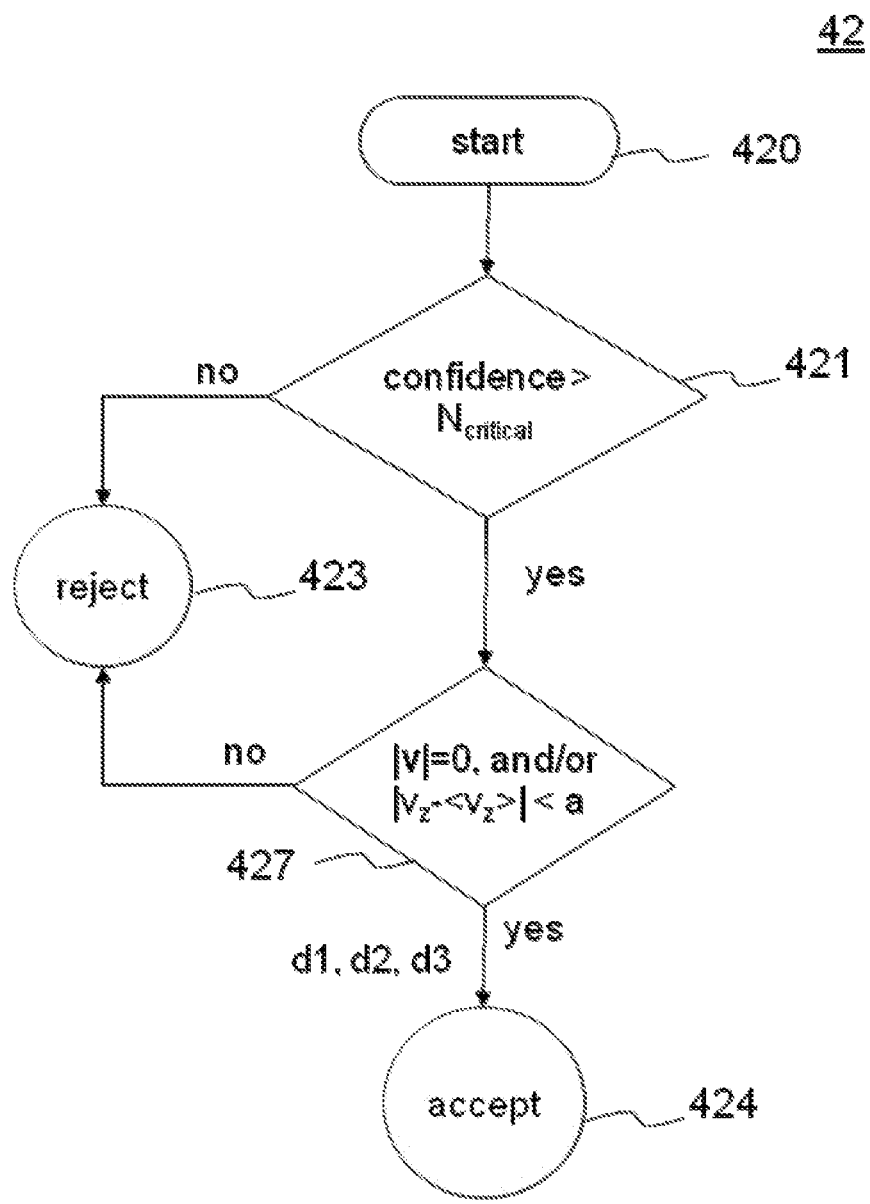

In the variant of FIG. 11, a calibration based on the distances from each laser to the pavement is employed for subsequent calibration to determine the sensor orientation. Specifically, in addition to subroutine 421, subroutine 427 determines whether the total speed is zero ($|v|=0$), i.e. whether the vehicle is moving, or whether the vertical movement due to car vibrations is below a predetermined threshold a. If both conditions are met, distance data $d_1$, $d_2$, $d_3$ acquired from the laser beams are accepted and used for determination of the sensor orientation with respect to the pavement.

In the following, two exemplary embodiments of calibration routines 45 are described with respect to FIGS. 12 and 13.

The calibration can either be running continuously, based on the data sent through to the calibration circuitry by the acceptor, or started now and then once a buffer with calibration data is filled.

If distance can be measured, two calibration angles are determined via the distance data, otherwise the calibration may also be based on the dynamics of the forward velocity $v_x$ and the vertical velocity $v_z$ only.

Figure 12:
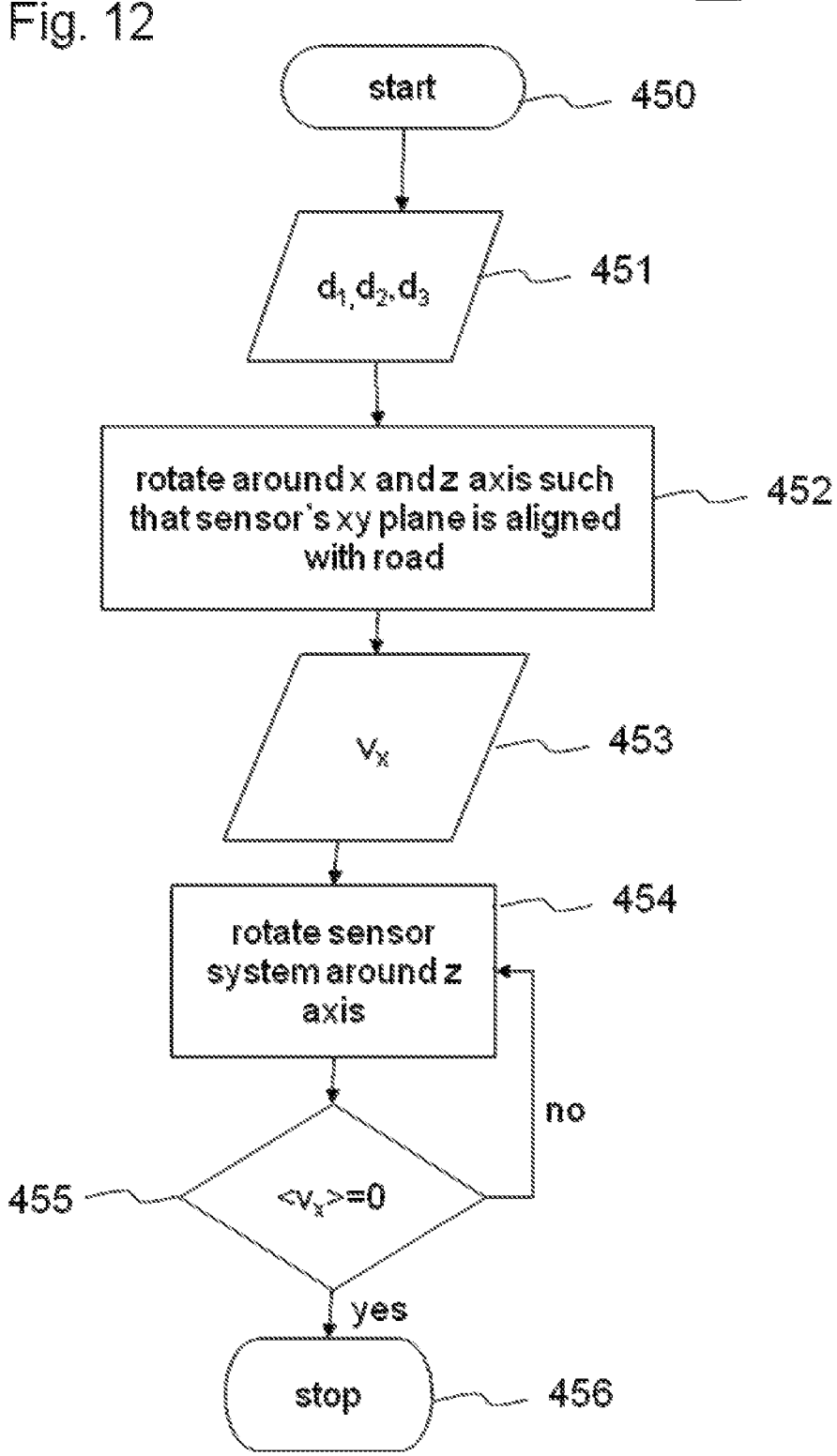

The calibration routine of the flow chart depicted in FIG. 12 is based on the steps of determining a first transformation that aligns a plane of the sensor coordinate system parallel to the reference surface, and determining a second transformation which rotates the plane of the sensor coordinate system around its perpendicular direction so that the amount of the lateral velocity is minimised.

The procedure is initialised at step 450, e.g. in response to step 424 of the routines shown in FIGS. 9 to 11.

Distance measurements along the laser beams 2, 4, 6 are input (step 451) into process 452, in which the sensor coordinate system is rotated around the x and z axes until the distance values transformed by this transformation indicate that the transformed xy plane (i.e. the plane spanned by the directions of the forward and lateral velocities) lies parallel to the road surface. The process 452 can as well be performed with velocity values of the vertical velocity. As explained with respect to FIG. 3, the laser beams will report vertical velocity components if the sensor system is tilted with respect to the surface normal of the reference surface. Thus, the process 452 can also be designed to rotate the vertical axis until the average of vertical velocity components vanishes.

The last unknown variable of the sensor orientation is its alignment with respect to the driving direction of the vehicle in this xy plane. For this purpose data of the lateral velocity $v_x$ adjusted by the first transformation are input (step 454) into decision routine 455. Then, in this routine 454 and test routine 455 the xy plane is rotated (around the z-axis) such that the amount of the lateral velocity, $<vx>$, is zero or below a predetermined threshold.

FIG. 13 shows a flow chart of a further embodiment of a calibration routine 45. This embodiment is based on the steps of determining a first transformation which minimises the component of the forward velocity in the direction of the sensor coordinate system perpendicular to the reference surface (such as the road in case of a car as the vehicle) or the amount of the velocity perpendicular to the reference surface, determining a second transformation which minimises the component of the lateral velocity, and determining a third transformation which minimises the correlation between the lateral and perpendicular components of movement.

After the routine 45 has been started (step 450), data 457 of the lateral velocity $v_x$ and the forward velocity $v_z$ are input to a first process 458. This process 458 rotates the sensor system around the x-axis, i.e. the axis along the direction of the lateral velocity. In decision routine 459, it is decided whether this rotation leads to a sufficiently small vertical velocity component $v_z$. Accordingly, process 458 and decision routine 459 together determine the first transformation which minimises the component of the forward velocity in the direction of the sensor coordinate system perpendicular to the road.

Then, in process 460 and decision routine 461, the sensor coordinate system is rotated about the z-axis, i.e. around the direction perpendicular to the reference surface, until the lateral velocity $\langle v_x \rangle$ of the transformed velocity values is below a predetermined threshold or zero. Thus, a second transformation which minimises the component of the average lateral velocity is applied.

Finally, in process 462 and decision routine 463, the correlation between the lateral velocity and the vertical velocity values is minimised or forced to be zero.

The procedure then ends in step 464 thus yielding a transformation being the combination of the first, second and third transformations. The transformation then can be applied to subsequently measured data.

Although preferred embodiments of the present invention have been illustrated in the accompanying drawings and described in the foregoing description, it will be understood that the invention is not limited to the embodiments disclosed but is capable of numerous modifications without departing from the scope of the invention as set out in the following claims.

LIST OF REFERENCE SIGNS 2, 4, 6, 7 Laser beams
5 Laser device unit
8 Forward direction
9 Lateral direction
10 Surface
13 Center axis of beams 2, 4, 6
14 Surface normal
15, 18, 19, 20 Azimuthal angle
16 Polar angle
22 Tilt angle
24 Measured forward velocity
25 Actual forward velocity
26 Measured lateral velocity
27 Actual lateral velocity
30, 31, 32 Self-mixing intensity oscillations
40 Initialising step for adjusting a self mixing laser sensor
41 process of reading out laser sensors
42 acceptor routine
43 external data
44 step of storing data acquired in process 41
45 calibration procedure
420 start of acceptor routine 42
421, 422, 425
426, 427 decision subroutines of acceptor routine 42
423 step of rejecting data
424 step of accepting data
450 start of calibration routine 45
451, 453, 457 data
452, 454, 458,
460, 462 process of rotating the sensor coordinate system
455, 459,
461, 463 decision subroutine
464 stop of calibration routine 45

The invention claimed is:

1. A method of adjusting a self-mixing laser sensor for measuring a velocity of a vehicle moving relative to a reference surface, the method comprising the acts of:
determining a frequency of self-mixing intensity oscillations caused by Doppler-induced phase shift of laser light reflected back from the reference surface and re-entering a cavity of at least one laser;
calculating a velocity from said frequency of the self-mixing intensity oscillations;
determining an orientation of the self-mixing laser sensor in relation to the reference surface and a predetermined direction of movement of the vehicle along said predetermined direction of movement using at least a first laser beam of said self-mixing laser sensor, said act of determining the orientation of the self-mixing laser sensor comprising the acts of determining whether a direction of movement of the vehicle coincides with the predetermined direction of movement, obtaining velocity data measured by the self-mixing laser sensor for the movement of said vehicle along said predetermined direction of movement, and calculating a transformation based on said velocity data for the movement of said vehicle along said predetermined direction of movement; and
adjusting the velocity data determined by the self-mixing laser sensor based on the determined orientation of the self-mixing laser sensor, said act of adjusting velocity data comprising applying said transformation to the measured velocity data,
wherein the at least one laser comprises three lasers for providing at least three laser beams, and wherein the method further comprises the acts of:
determining the velocity along the predetermined direction from said self-mixing intensity oscillations;
detecting phase jumps or minima of a self-mixing Doppler induced intensity oscillation of at least one of at least three laser beams at interfaces of speckle induced intensity oscillations; and
correcting a deviation of a signal derived from a frequency of the Doppler induced intensity oscillation at the interfaces of speckle induced intensity oscillations, the deviation resulting from the Doppler-induced phase shift.

2. The method of claim 1, further comprising the acts of:
determining the orientation of the self-mixing laser sensor by at least a second laser beam and a third laser beam being emitted in linear independent directions with respect to each other and the first laser beam; and
adjusting the velocity data by a coordinate transformation which compensates a mismatch in the orientation of the self-mixing laser sensor and the reference surface.

3. The method of claim 1, comprising the act of determining the predetermined direction of movement of the vehicle by a device selected from a group consisting of a steering wheel sensor, an acceleration sensor, a compass, a comparison of rotation speed data of wheel speed sensors, and a GPS unit.

4. The method of claim 1, comprising the act of determining the predetermined direction of movement of the vehicle by storing measured velocity data and averaging said data, said averaged data representing said predetermined direction of movement.

5. The method according to claim 1, wherein the act of obtaining velocity data for the movement of the vehicle along the predetermined direction of movement is carried out in response to a measurement of a velocity component exceeding or falling below a predetermined threshold.

6. The method according to claim 1, wherein the act of calculating the transformation based on said velocity data for the movement of said vehicle along said predetermined direction of movement comprises the acts of;
determining a first transformation that aligns a plane of a sensor coordinate system of the self-mixing laser sensor parallel to the reference surface, and determining a second transformation which rotates the plane of the sensor coordinate system around its perpendicular direction so that an amount of a lateral velocity of the vehicle is minimized.

7. The method according to claim 1, wherein the act of calculating the transformation based on said velocity data for the movement of said vehicle along said predetermined direction of movement comprises the acts of:
  determining a first transformation which minimizes a component of a forward velocity of the vehicle in a direction of a sensor coordinate system perpendicular to the reference surface or an amount of the velocity perpendicular to the reference surface,
  determining a second transformation which minimizes a component of a lateral velocity of the vehicle, and
  determining a third transformation which minimizes a correlation between the lateral and perpendicular components of the movement of the vehicle.

8. The method according to claim 1, wherein the acts of calculating the transformation based on said velocity data for the movement of said vehicle along said predetermined direction of movement comprises the acts of:
  determining three distances between the at least one laser and said reference surface; and
  calculating a further transformation from said three distances, said further transformation aligning velocity components of the at least one laser in center coordinates to velocity components of the reference surface.

9. A laser self-mixing velocity sensor for determining a velocity of an vehicle moving relative to a reference surface, comprising:
  at least one laser; and
  a processor configured to:
  determine a frequency of self-mixing intensity oscillations caused by Doppler-induced phase shift of laser light reflected back from the reference surface and re-entering a cavity of the at least one laser;
  determine the velocity along a predetermined direction of movement of said vehicle from said self-mixing intensity oscillations;
  determine an orientation of the laser self-mixing velocity sensor in relation to the reference surface using at least a first laser beam of said laser self-mixing velocity sensor;
  determine whether a direction of movement of the vehicle coincides with the predetermined direction of movement,
  obtain velocity data for the movement of said vehicle along said predetermined direction of movement, and
  calculate a transformation based on said velocity data for the movement of said vehicle along said predetermined direction of movement,
  wherein the at least one laser comprises three lasers for providing at least three laser beams, and wherein the processor is further configured to:
  determine the velocity along at least one predetermined direction from said self-mixing intensity oscillations,
  detect phase jumps or minima of a self-mixing Doppler induced intensity oscillation of at least one of the at least three laser beams at interfaces of speckle induced intensity oscillations, and
  correct a deviation of a signal derived from a frequency of the Doppler induced intensity oscillation at the interfaces of speckle induced intensity oscillations, the deviation resulting from the Doppler-induced phase shift.

10. The laser self-mixing velocity sensor according to claim 9,
  wherein the processor is further configured to:
  adjust the velocity data determined by the laser self-mixing velocity sensor based on the determined orientation of the laser self-mixing velocity sensor by applying said transformation to measured velocity data;
  determine the orientation of the laser self-mixing velocity sensor by measuring a vertical velocity of the vehicle perpendicular to the reference surface; and
  adjust the velocity data by a coordinate transformation so that an adjusted average of the measured vertical velocity is zero.

11. The laser self-mixing velocity sensor of claim 9, wherein the processor is further configured to:
  determine the orientation of the laser self-mixing velocity sensor by at least a second laser beam and a third laser beam being emitted in linear independent directions with respect to each other and the first laser beam; and
  adjust the velocity data by a coordinate transformation which compensates a mismatch in the orientation of the laser self-mixing velocity sensor and the reference surface.

12. The laser self-mixing velocity sensor of claim 9, further comprising a device selected from a group consisting of a steering wheel sensor, an acceleration sensor, a compass, a comparison of rotation speed data of wheel speed sensors, and a GPS unit for determining the velocity along a predetermined direction of movement of said vehicle.

13. The laser self-mixing velocity sensor of claim 9, wherein the processor is further configured to determine the predetermined direction of movement of the vehicle by storing measured velocity data and averaging said data, said averaged data representing said predetermined direction of movement.

14. The laser self-mixing velocity sensor of claim 9, wherein the processor obtains the velocity data for the movement of the vehicle along the predetermined direction of movement in response to a measurement of a velocity component exceeding or falling below a predetermined threshold.

15. The laser self-mixing velocity sensor of claim 9, wherein the processor is further configured to:
  determine a first transformation that aligns a plane of a sensor coordinate system of the laser self-mixing laser velocity sensor parallel to the reference surface; and
  determine a second transformation which rotates the plane of the sensor coordinate system around its perpendicular direction so that an amount of a lateral velocity of the vehicle is minimize.

16. The laser self-mixing velocity sensor of claim 9, wherein the processor calculates the transformation based on said velocity data for the movement of said vehicle along said predetermined direction of movement by:
  determining a first transformation which minimizes a component of a forward velocity of the vehicle in a direction of a sensor coordinate system perpendicular to the reference surface or an amount of the velocity perpendicular to the reference surface,
  determining a second transformation which minimizes a component of a lateral velocity of the vehicle, and
  determining a third transformation which minimizes a correlation between the lateral and perpendicular components of the movement of the vehicle.

17. The laser self-mixing velocity sensor of claim 9, wherein the processor calculates the transformation based on said velocity data for the movement of said vehicle along said predetermined direction of movement by:

determining three distances between the at least one laser and said reference surface; and calculating a further transformation from said three distances, said further transformation aligning velocity components of the at least one laser in center coordinates to velocity components of the reference surface.

18. The method of claim 1, further comprising acts of:

determining the orientation of the self-mixing laser sensor by measuring a vertical velocity of the vehicle perpendicular to the reference surface; and adjusting the measured velocity data by a coordinate transformation so that an adjusted average of the measured vertical velocity is zero.

* * * * *